United States Patent
Gentry et al.

(10) Patent No.: US 6,799,210 B1
(45) Date of Patent: Sep. 28, 2004

(54) DYNAMIC ASSOCIATION OF ENDPOINTS TO MEDIA GATEWAY CONTROLLERS

(75) Inventors: William D. Gentry, Raleigh, NC (US); Jason G. Emery, Apex, NC (US); Samuel H. Christie, IV, Cary, NC (US)

(73) Assignee: Nortel Networks Limited, St. Laurent (CA)

(*) Notice: Subject to any disclaimer, the term of this patent is extended or adjusted under 35 U.S.C. 154(b) by 765 days.

(21) Appl. No.: 09/598,867

(22) Filed: Jun. 21, 2000

(51) Int. Cl.[7] .................................. G06F 15/173
(52) U.S. Cl. .............. 709/223; 709/226; 709/227; 709/229; 709/238; 370/352; 370/356; 370/401
(58) Field of Search .................. 709/223, 226–230, 709/235–238, 244, 249–250; 370/229, 352–356, 400–401

(56) References Cited

U.S. PATENT DOCUMENTS

| | | | | |
|---|---|---|---|---|
| 6,449,251 B1 | * | 9/2002 | Awadallah et al. | 370/229 |
| 6,515,985 B2 | * | 2/2003 | Shmulevich et al. | 370/356 |
| 6,603,760 B1 | * | 8/2003 | Smyk | 370/352 |
| 6,611,516 B1 | * | 8/2003 | Pirkola et al. | 370/352 |
| 6,631,416 B2 | * | 10/2003 | Bendinelli et al. | 709/227 |
| 6,671,263 B1 | * | 12/2003 | Potter et al. | 370/401 |
| 6,674,713 B1 | * | 1/2004 | Berg et al. | 709/227 |
| 6,680,952 B1 | * | 1/2004 | Berg et al. | 370/401 |

* cited by examiner

Primary Examiner—Bharat Barot
(74) Attorney, Agent, or Firm—Withrow & Terranova, PLLC

(57) ABSTRACT

The present invention provides an architecture for a media gateway to identify and register with multiple media gateway controllers for various types of voice and data services, along with having the media gateway appear to each of these media gateway controllers as a single, dedicated control entity. A logical layer, referred to as a virtualizer, is associated with each media gateway and appears to the media gateway as a single media gateway controller. To each media gateway controller the virtualizer supports, the virtualizer appears as a single media gateway. In essence, the virtualizer is a protocol manager and message router. The virtualizer supports the registration of multiple media gateways and then creates virtual gateways based on requirements of the media gateway controllers serving these virtual gateways. Preferably, subscribers associated with endpoints handled by the media gateway are grouped into a virtual gateway being served by a select media gateway controller or group thereof.

28 Claims, 9 Drawing Sheets

DYNAMIC ASSOCIATION OF ENDPOINTS TO MEDIA GATEWAY CONTROLLERS

FIELD OF THE INVENTION

The present invention relates to telecommunications, and particularly, to providing telephony services from disparate media gateway controllers for a single media gateway.

BACKGROUND OF THE INVENTION

There is a growing interest in the convergence of the public switched telephone network (PSTN), the Internet and other internets and intranets. The convergence of these networks requires technology that facilitates interworking in a uniform and effective manner. The next generation of unified networks will provide an open and scalable architecture to accommodate multiple vendors and protocols under a single communication scheme. At the moment, there are several obstacles to providing a scalable, unified network incorporating the PSTN, Internet, cable systems, and wireless systems, among other existing and further networks.

The traditional PSTN provides constant bandwidth streams of information between users. These media streams travel over dedicated circuits, typically between telephones. Circuit-switched networks were originally designed for carrying voice traffic and handling calling patterns, but, with the emergence of the Internet, are now handling significant amounts of data traffic. The data traffic occupies a significant amount of the bandwidth of the circuit-switched network as the data makes its way to Internet protocol (IP)-based networks. In addition, the IP-based networks are now carrying significant amounts of data that relate to voice, fax and video in addition to conventional data. Further, advances in cable and wireless technologies are requiring cable networks and wireless networks to efficiently interact with the PSTN and the IP-based Internet.

Since packet switching networks appear to be the common thread between all of the many networks, there is a need to seamlessly interwork all networks and individual endpoints connecting to these networks. The interface between networks, as well as between a network and individual endpoints, is provided by media gateways. Media gateways require interaction with media gateway controllers to provide decision-making and coordination with other media gateways.

The primary responsibility of the media gateway is to allow media of various types, including voice, fax, video and data to be transported in a unified network. Typically, the media must be transportable both as packets in an IP-based network and as digital or analog streams in a circuit-switched network. In such applications, the media gateway provides bi-directional communications between a circuit-switched network and media-related elements associated with an IP network. Media gateways generally interact with end users in telephony applications or with other media gateways to facilitate such applications. The media gateway controllers provide media gateways with instructions on interconnecting two or more telephony or IP elements in order to exchange information. For example, media gateway controllers instruct media gateways on how to set up, handle and terminate media flows, such as Internet connections or telephone calls.

Existing media gateways are very rigid in structure and configuration. Typically, all endpoints associated with a media gateway are served by a single media gateway controller. Although the H.248 protocol standard for packet telephony set forth by the International Telecommunications Union and the Internet Engineering Task Force indicates that groups of endpoints within a single gateway may be handled by separate media gateway controllers, there is a need for increasing the flexibility of handling endpoints by multiple media gateway controllers and providing an efficient way of allocating endpoints with one or more media gateway controllers. Given the present standards and architectures, it is likely a given media gateway will have only a small number of defined groupings of endpoints capable of being served by different media gateway controllers. Thus, a single media gateway will likely be controlled by only a very small number of media gateway controllers.

In order to maximize the service and selection to end users, it is desirable to enable individual lines or endpoints of a media gateway to be supported by any media gateway controller throughout the network. Current architectures do not allow subscribers at any given endpoint to receive media and data services provided by media gateway controllers operated by different service providers, nor do they allow media gateways to interact with call servers supporting variations in communication and media control protocols.

The existing rigidity in media gateways prevents 1) dynamically changing associations between endpoints and media gateway controllers to facilitate efficient changes in service for users in a given endpoint; 2) easily scaling the system to accommodate additional endpoints; and 3) readily reassigning and distributing endpoints to other media gateway controllers in case of congestion or failure of a media gateway controller.

As such, there is a need for a more efficient and flexible architecture allowing dynamic association of media gateway endpoints with any number of media gateway controllers.

SUMMARY OF THE INVENTION

The present invention addresses the failings of the state-of-the-art by providing an architecture for a media gateway to identify and register with multiple media gateway controllers for various types of voice and data services, along with having the media gateway appear to each of these media gateway controllers as a single, dedicated control entity. A logical layer, referred to as a virtualizer, is associated with each media gateway and appears to the media gateway as a single media gateway controller. To each media gateway controller the virtualizer supports, the virtualizer appears as a single media gateway. In essence, the virtualizer is a protocol manager and message router. The virtualizer supports the registration of multiple media gateways and then creates virtual gateways based on requirements of the media gateway controllers serving these virtual gateways. Preferably, subscribers associated with endpoints handled by the media gateway are grouped into a virtual gateway being served by a select media gateway controller or group thereof.

The virtualizer interacts with the network manager to determine the media gateway controllers it should register against, depending on the type of services requested by the subscribers. As events are reported from the media gateway, the virtualizer routes resulting messages to the appropriate media gateway controller. Conversely, the media gateway commands received from the media gateway controller are forwarded to the appropriate media gateway. The virtualizer may translate commands or event reports as required in the event the media gateway or media gateway controller are not using identical versions of a particular protocol.

The virtualizer and the virtual gateways associated therewith may be incorporated in a media gateway, a media gateway controller, or a third device coupled to an accessible network. Importantly, the system handling the virtualizer operation is configured to dynamically associate endpoints for one or more gateways as a virtual gateway and arrange the necessary relationship with one or more media gateway controllers. The dynamic handling and creation of these relationships allows efficient controlling of individual lines and endpoints to be supported from any media gateway controller in the network. Further, subscribers at any given endpoint may receive media and data services from multiple service providers at any given time. The ability to dynamically change associations allows for efficient scaling of the system to add media gateways and endpoints to existing, as well as new, media gateway controllers. Further, the virtualizer may support a secondary or backup association with a media gateway controller in case the primary media gateway controller fails or becomes overly congested.

Other aspects and features of the present invention will become apparent to those ordinarily skilled in the art upon reviewing the following description of the preferred embodiments of the invention in conjunction with the accompanying figures.

BRIEF DESCRIPTION OF THE DRAWINGS FIGURES

FIG. 5A is a chart providing an example mapping between endpoints on multiple gateways and media gateway controllers.

DETAILED DESCRIPTION OF THE PREFERRED EMBODIMENTS

The focus of the present invention is to facilitate seamless interworking of communication networks, including the public switched telephone network (PSTN), SS7 networks, cable, wireless, and multi-purpose packet switching networks, such as IP-based networks. To facilitate the interconnection and interworking of various ones of these networks, there are two primary elements: a media gateway and a media gateway controller. The media gateway provides the actual interface between networks and connection of various subscribers via endpoints. The media gateway controller provides decision-making and coordination between media gateways to facilitate interworking.

The primary responsibility of a media gateway is to allow media of various types, such as data, voice and video, to be transported in unified networks. Media gateways are configured to allow media to be transportable, both as packets in an IP or ATM network and as analog or digital streams in more traditional circuit-switched networks. The gateways allow media to move without loss of integrity or quality between networks and network technologies. In essence, the media gateway provides a bi-directional interface between networks, and typically, between a circuit-switched network and media-related elements in an IP network. Media gateways may interact with IP telephony applications residing in computers attached to a network, or with other media gateways. Media gateways may also provide physical interfaces to the public switched telephone network and may be used to replace switching components normally used in the plain old telephone system (POTS).

The primary responsibilities of the media gateway controller are to make decisions based on flow-related information and to provide instructions on interconnecting elements or endpoints within and throughout the networks. Media gateway controllers store status information on media flows and may be used to generate administrative records for a variety of media-related activities, such as billing. Most prominently, media gateway controllers provide coordination of media gateways. Typically, media gateway controllers direct media gateways to set up, handle and terminate individual media flows. As an analogy, media gateway controllers would implement the call control functionality found in switching elements in a PSTN. The switching elements that provide the media path for the call are analogous to the media gateways. Notably, this disclosure anticipates the replacement of switching elements of the PSTN with media gateways and media gateway controllers.

Figure 1:
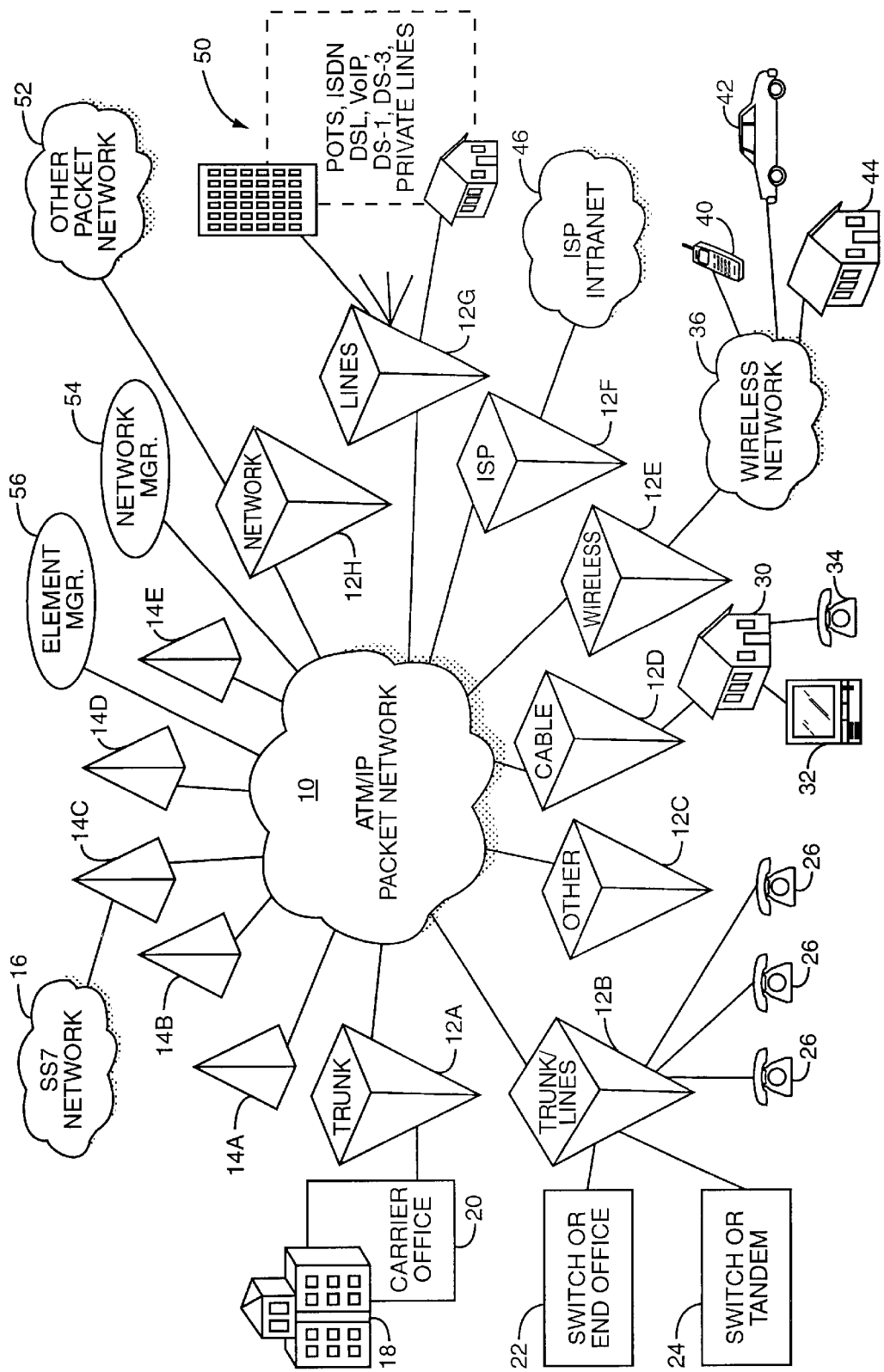
FIG. 1 is an overview of a comprehensive network incorporating multiple applications of the present invention.

FIG. 1 provides an outline of the various types of configurations and implementations for media gateways and media gateway controllers. As depicted, an ATM and/or IP packet network 10 may be the center of a particular network topology. The packet network 10 may represent a single network or thousands of networks operating together to form an internet. Hanging off of the packet network 10 are a variety of elements capable of communicating with one another and elements on additional networks. With particular reference to the present invention, a series of media gateways 12A-12H are shown coupled to a variety of systems and networks. For example, media gateways 12A, 12B and 12G are configured to connect to and cooperate with traditional telephony systems, such as the carrier office 20, which serves a municipality or community 18. In this instance, the media gateway 12A provides a trunk interface to the carrier office 20 from the packet network 10.

Similarly, media gateway 12B provides a trunk and individual line interfaces to a switch or end office 22 as well as to a switch or tandem 24. Media gateway 12B also provides individual endpoints for providing local telephone loops for telephones 26. The systems may also be configured to handle private branch exchanges and the like.

Media gateway 12G provides line interfaces to various points throughout a community 50 to provide any number of telephony services such as POTS, ISDN, DSL, voice over IP, DS-1, DS-3, or other private line services. Importantly, these examples are provided to show that the media gateway may provide a variety of interfaces to the traditional telephone system and replace analogous elements therein. In these configurations, the gateway provides a circuit-switched, time-division multiplexing (TDM) interface to the traditional telephony network and a packet-switched interface to the packet network 10.

Continuing with FIG. 1, another exemplary gateway configuration provides a cable interface. Media gateway 12D provides the interface between the packet network 10 to a residence 30 to provide data, voice and audio to any number of devices, including televisions 32 and telephones 34.

Gateway 12E is configured to couple the packet network 10 to a wireless network 36. A wireless interface allows communications from any number of mobile terminals, such as wireless telephones 40, vehicles 42, and modems or wireless local area networks for residences or businesses 44. The media gateway 12E may function as a base station or mobile switching center.

Continuing with the possible options, media gateway 12F is configured to be an Internet service provider media gateway that couples to an ISP or intranet of ISPs 46. As noted, media gateways may be configured as media gateway 12H, wherein an interface is created between the ATM or IP packet network 10 and another packet network 52 using a different networking technology or protocol.

In addition to the media gateways, the media gateway controllers 14A–14E are coupled to the packet network 10 to provide control for the media gateways as well as control services to the gateway or users connected to the gateway. As noted, the media gateway controllers may instruct media gateways on how to set up, handle and terminate individual media paths and flows between media gateways. These functions are discussed in greater detail below. The media gateway controllers 14 may also cooperate with or function as media servers to provide data, audio and video content. Further, as shown in association with media gateway controller 14C, the media gateway controller may provide an interface for an SS7 network 16, which is used to set up, handle and terminate calls over the PSTN.

As is apparent from FIG. 1, the media gateway controllers 14 and media gateways 12 facilitate the convergence of differing networks to provide integrated interworking systems that bring together traditional telephony with next generation communication networks and systems.

Figure 2:
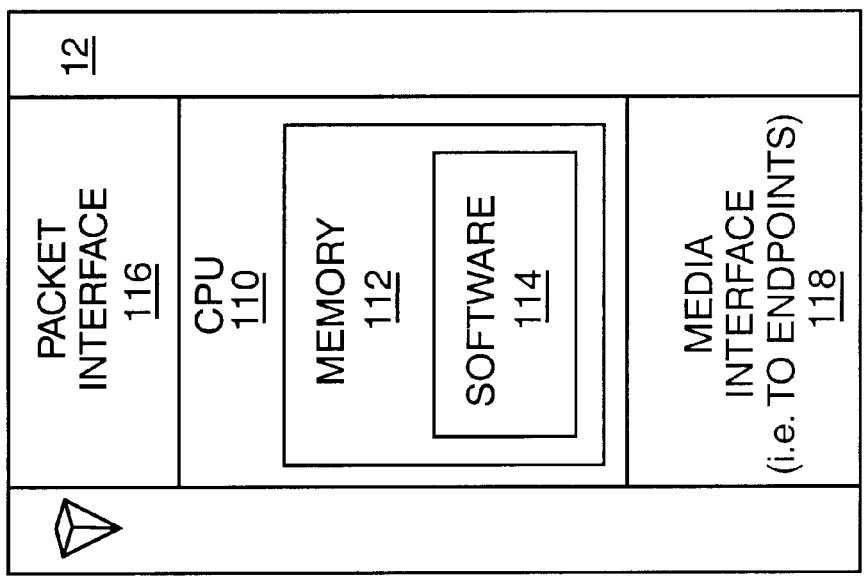
FIG. 2 is a block representation of a media gateway according to the present invention.

Referring now to FIG. 2, a block schematic of a media gateway 12 is shown having a central processing unit (CPU) 110 containing memory 112 and the requisite software 114. The CPU 110 cooperates to provide a bi-directional interface between a packet interface 116 and the media interface 118. The packet interface 116 would preferably connect to a packet network, as referenced in FIG. 1, while the media interface 118 is the interface opposite the packet network 10 and may range from traditional trunks and lines of a telephone network to a cable or wireless system. As such, the media interface 118 may handle various packet or circuit-switching technologies. For example, when interfacing with traditional telephony, the media interface 118 is configured to handle TDM communications or any other analog or digital data streams required to facilitate communications. If used to interface with another packet network, the media interface can handle packet-switching technologies. Regardless of configuration, the media interface 118 is typically associated with multiple addresses or locations for end users or end applications. For the purpose of the discussion herein and the claims that follow, the term "endpoints" is used to correspond to a particular address, designated application, or telephone number.

Figure 3:
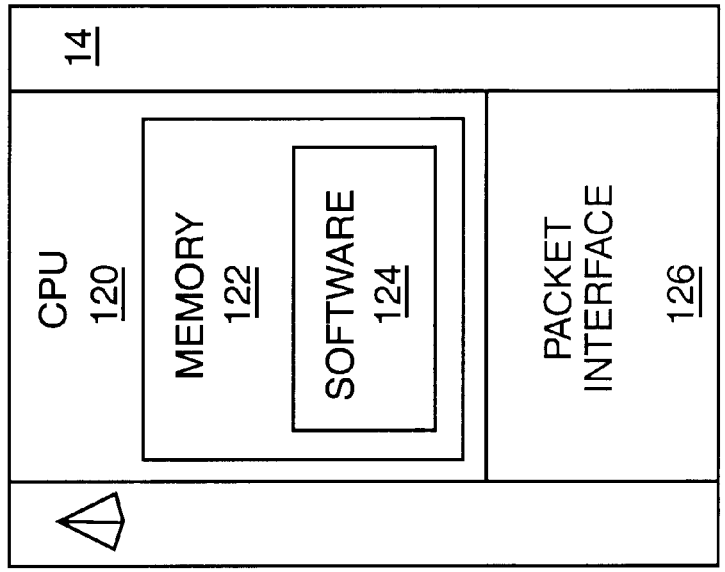
FIG. 3 is a block schematic of a media gateway controller according to the present invention.

FIG. 3 is a block schematic of a media gateway controller 14 having a CPU 120 with associated memory 122 and software 124. The media gateway controller 14 will have at least one interface, preferably a packet interface 126 capable of communicating across the ATM/IP packet network 10.

Figure 4:
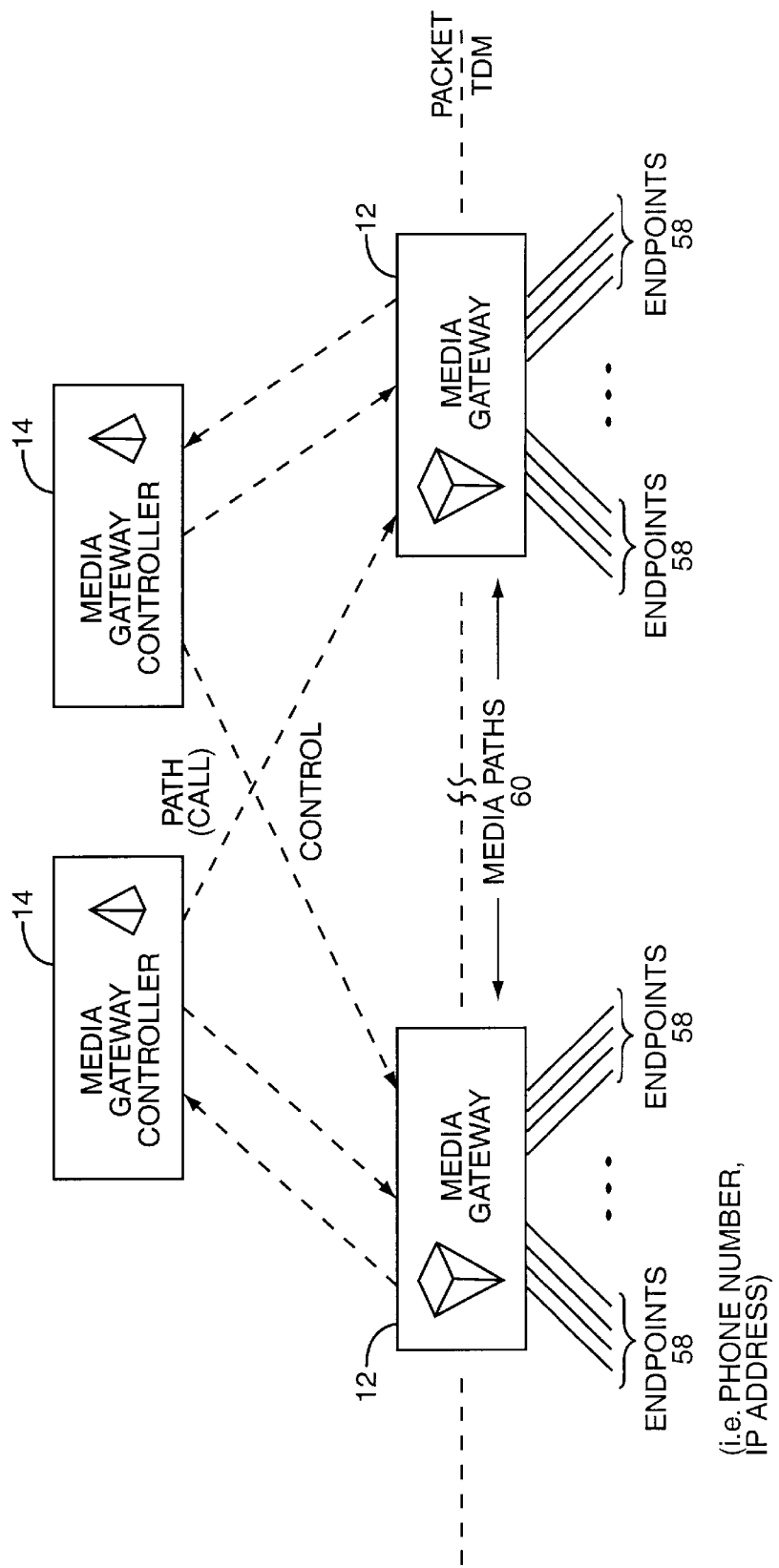
FIG. 4 is a block representation of the interaction between media gateways and media gateway controllers according to the present invention.

For the purpose of describing the preferred embodiments of the present invention, the following description assumes the media gateways 12 provide a bi-directional interface between a circuit-switched network, such as the TDM-based public switched telephone network and media-related elements in an IP network. It is also assumed that the media gateways will interact either with IP telephony end-user applications residing in computers attached to the IP network, with end-user telephones, or with other media gateways. It is important to understand that the media gateways can implement a variety of physical interfaces to the PSTN. For example, the media gateway may implement a high-speed TDM trunk interface or line interface, which are commonly used interfaces between switching elements in a circuit-switched network. Thus, as shown in FIG. 4, media gateways 12 provide an interface to a plurality of endpoints 58, which correspond with IP addresses or phone numbers in a TDM network. On the other side of the media gateway 12, the packet interface will interface with the IP/ATM packet network 10 to communicate with one or more media gateway controllers 14 and other media gateways 12.

Conventional media gateways are configured to associate one or more sets of endpoints to one or more media gateway controllers 14. Prior to Applicant's invention, associating endpoints of a media gateway with a specific media gateway controller was cumbersome and inefficient. Currently, there is no way to easily define these associations or change such associations dynamically. When establishing a call or media path 60 between an originating endpoint 58 on one media gateway 12 and a terminating endpoint 58 on another media gateway 12, the respective media gateways 12 would contact their associated media gateway controllers 14, which cooperate with one another and with the media gateways to establish the media path 60. The rather inflexible nature of media gateways and their association of endpoints with media gateway controllers results in inefficiencies when new endpoints are added. Further, there is no way to efficiently reassign a media gateway controller to endpoints when a media gateway fails or when increases in the number of endpoints and traffic requires reassignment to increase efficiency of the network.

Figure 5:
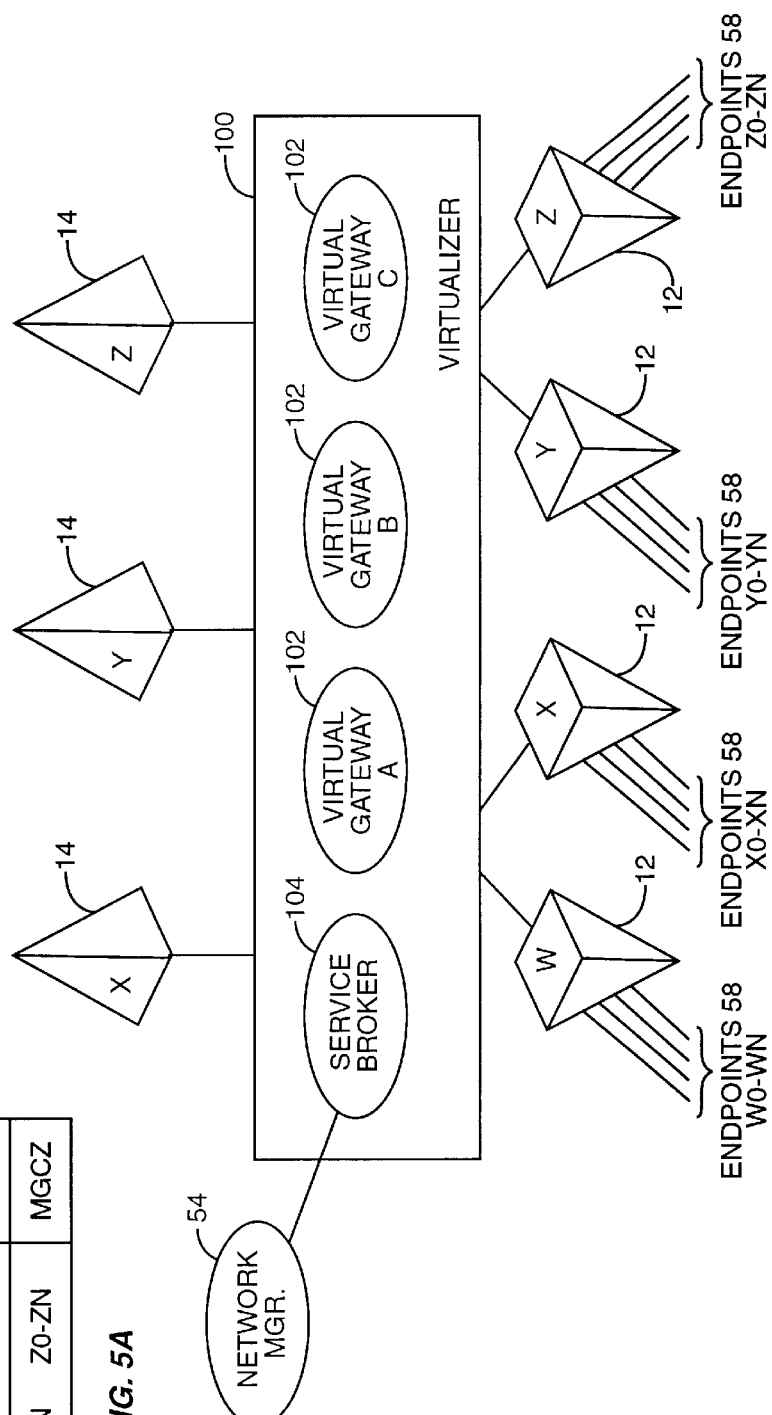
FIG. 5 is a block representation of a virtualizer logic layer according to the present invention.

In contrast to these traditional media gateway configurations and as shown in FIG. 5, the present invention provides a logical layer, referred to as a virtualizer 100 between a media gateway 12 and a media gateway controller 14. The virtualizer 100 is configured to dynamically create associations between media gateway controllers 14 and a set of physical endpoints 58 on one or more media gateways 12. The virtualizer 100 allows for the creation of virtual gateways 102 that effect a media gateway controller interface to media gateways 12, and a media gateway interface to media gateway controllers 14. The virtualizer 100 may also provide a service broker 104, which interacts with network directories through a network manager 54 to determine how endpoints 58 should be distributed between and among the media gateway controllers 14.

For example, the representation of the virtualizer 100 in FIG. 5 may allocate endpoints on a number of media gateways 12 to media gateway controllers 14 as shown in FIG. 5A. Notably, the virtualizer 100 provides three virtual gateways 102 that are respectively labeled A, B and C. Virtual gateway A (102) maps the endpoints W0 through WN of media gateway W (12) and endpoints X1 through X3 of media gateway X (12) to media gateway controller X (14). Virtual gateway B (102) maps the remaining endpoints of media gateway X (12), X4 through XN, to media gateway controller Y (14). Virtual gateway C (102) maps all the endpoints (58) from media gateways Y (12) and Z (12) to media gateway controller Z (14). The service broker 104 may be used for initial setup and configuration of the virtualizer 100 to distribute the endpoints 58 for the various media gateways 12 to the designated media gateway controllers 14.

The virtualizer 100 allows each virtual gateway 102 to appear to the physical media gateway as a single media gateway controller. To each media gateway controller the virtualizer supports, the virtual gateways appear as a single media gateway. Preferably, the virtualizer 100 is a protocol manager and message router. The virtualizer 100 supports the registration of multiple gateways 12 and then creates virtual gateways 102 based on the media gateway controller requirements of the entire set of endpoints. Each virtual gateway 102 is then registered with its controlling media gateway controller as a separate gateway.

The virtualizer 100 may interact with the network manager 54 to determine which media gateway controllers 14 it should register against, depending on the type of services requested by the subscriber at any of the given endpoints. As events are reported from the physical, media gateway 12, the virtualizer 100 simply routes the message to the appropriate media gateway controller 14. Conversely, media gateway commands received from the media gateway controller 14 are forwarded to the appropriate media gateway 12. Optionally, the virtualizer 100 may translate the command or event report in the event that the media gateway controller 14 and the media gateway 12 are not using identical versions of a protocol or different protocols altogether.

Importantly, the virtualizer 100 and the virtual gateways 102 provided thereby can be implemented in the media gateway 12, the media gateway controller 14, a separate network entity, or combination thereof. Further, the virtualizer 100 and associated virtual gateways 102 may be isolated to one of these devices or spread over any number of these devices. For the remaining portion of the detailed description, it is assumed that the virtualizer 100 is run on a single media gateway 12 as shown in FIG. 6.

Figure 6:
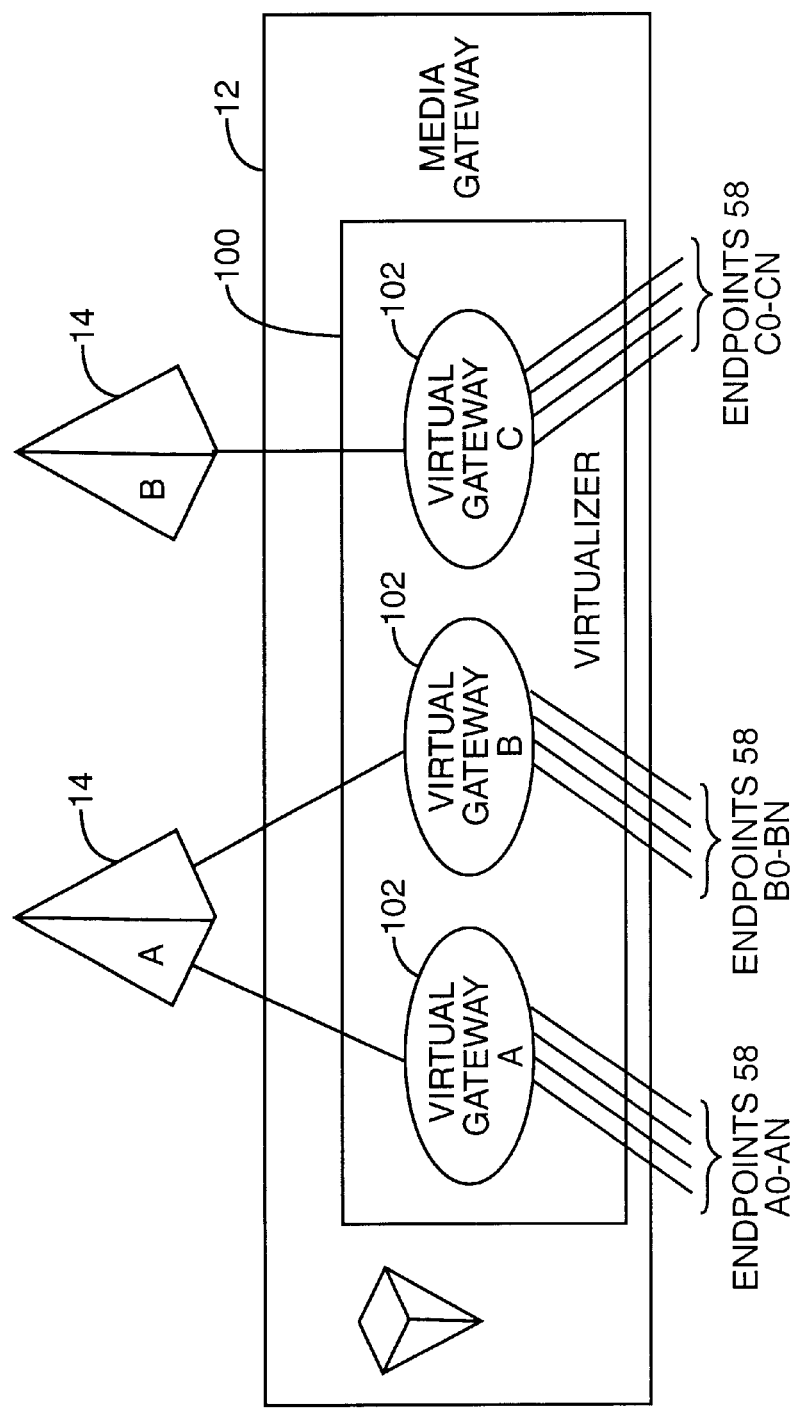
FIG. 6 is a block representation of a virtualizer providing multiple virtual gateways within a single media gateway.

FIG. 6 depicts a media gateway 12 having a virtualizer 100 and three virtual gateways 102, which are designated A, B and C. All the endpoints A0 through AN, B0 through BN and C0 through CN are allocated to respective virtual gateways A, B and C. Endpoints A0 through AN are associated with media gateway controller A via virtual gateway A. Similarly, endpoints B0 through BN are associated with media gateway controller A via virtual gateway B. In contrast, endpoints C0 through CN are associated with media gateway controller B via virtual gateway C. The virtualizer may interact with a variety of network elements, such as the network manager 54 via a service broker 104 to dynamically change the association of endpoints with the media gateway controllers 14. For example, endpoints A0 through AN or any portion thereof may be dynamically reallocated to media gateway controller B in real time without the need for the timely configuration associated with current media gateways.

For registration, media gateways 12 preferably interact with an element manager 56 (FIG. 1) to determine the IP address for their primary media gateway controller 14. The primary media gateway controller's IP address will map to the virtualizer 100, and in particular, to a specific virtual gateway 102 in the virtualizer 100.

If a service change or end-point activation message, such as an H.248 service message, is sent to the virtualizer 100, it will interact with the service broker 104, and the network manager 54 (FIG. 1) if necessary, to identify the media gateway controllers 14 associated with the endpoints 58 identified in the service change request. A virtual gateway 102 is created for the identified group of endpoints 58 and a signaling link is established between the virtual gateway 102 and the corresponding media gateway controller 14. The service change message is then sent to the media gateway controller 14. The virtualizer 100 maintains a mapping between endpoints 58, the virtual gateway 102, and the physical media gateway 12. Responses from the media gateway controller 14 are sent to the virtual gateway 102. The virtual gateway 102 maps this to a physical gateway 12 and forwards the message to the physical gateway 12.

For media or call control, call control messages, such as H.248 control messages, are sent from the media gateway 12 to the virtualizer 100. The virtualizer 100 maps the endpoints 58 to a virtual gateway 102, and then passes the message via a signaling point associated with the virtual gateway 102 to the proper media gateway controller 14. Responses from the media gateway controller 14 are routed in reverse direction to the media gateway 12. In essence, the virtualizer 100 performs a message routing function that is dynamically configurable.

Figure 7:
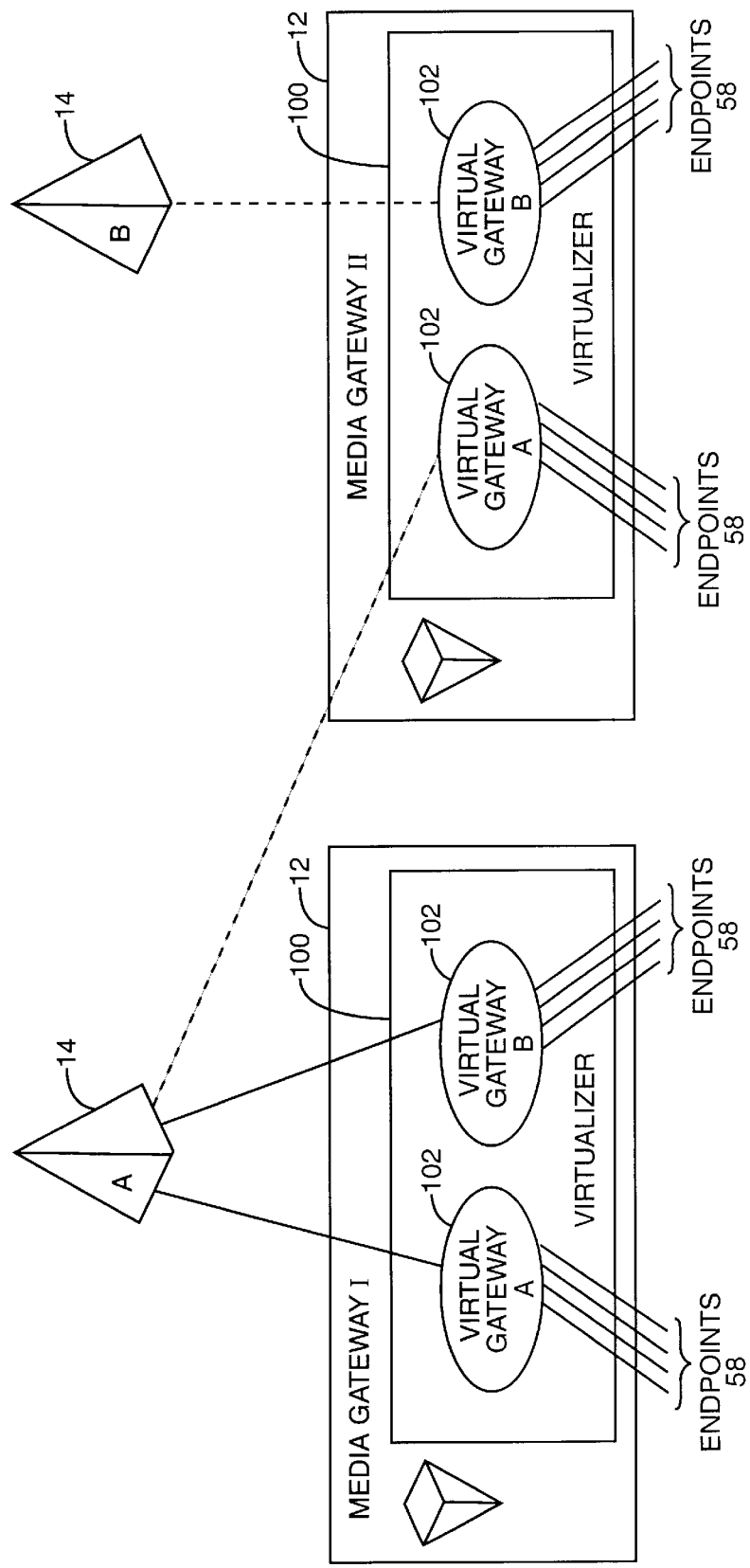
FIG. 7 is a block representation of scaling endpoint allocation.

In addition to the ready ability to re-configure and re-register endpoints for a media gateway 12 with a combination of media gateway controllers 14, the virtualizer 100 provides easy growth and scaling for media gateway controllers 14. With reference to FIG. 7, media gateway I (12) has a virtualizer 100 with two virtual gateways 102 associated with corresponding sets of endpoints 58. The virtual gateways 102 associated with media gateway I (12) are mapped to media gateway controller A (14). The solid lines coupling media gateway controller A (14) and virtual gateways A and B (102) represent an initial configuration. If additional endpoints are added and media gateway controller A (14) has excess capacity, a new media gateway II (12) may be provided with a virtualizer 100 having two virtual gateways 102. In the present example, virtual gateway A of media gateway II is mapped to media gateway controller A (14) while virtual gateway B (102) is mapped to media gateway controller B (14). In essence, the system enables distribution of endpoints of a large gateway between multiple media gateway controllers as well as distribution of media gateway controllers among multiple media gateways. These distributions are dynamically configurable in real time using internal controls or instructions from any number of network devices, including media gateway controllers.

The scaling ability provided by the present invention is particularly useful when the capacity of a trunk or business group must be increased. Any additional capacity for the particular trunk or business group may be handled by another media gateway and the same media gateway controller as the original group.

Figure 8:
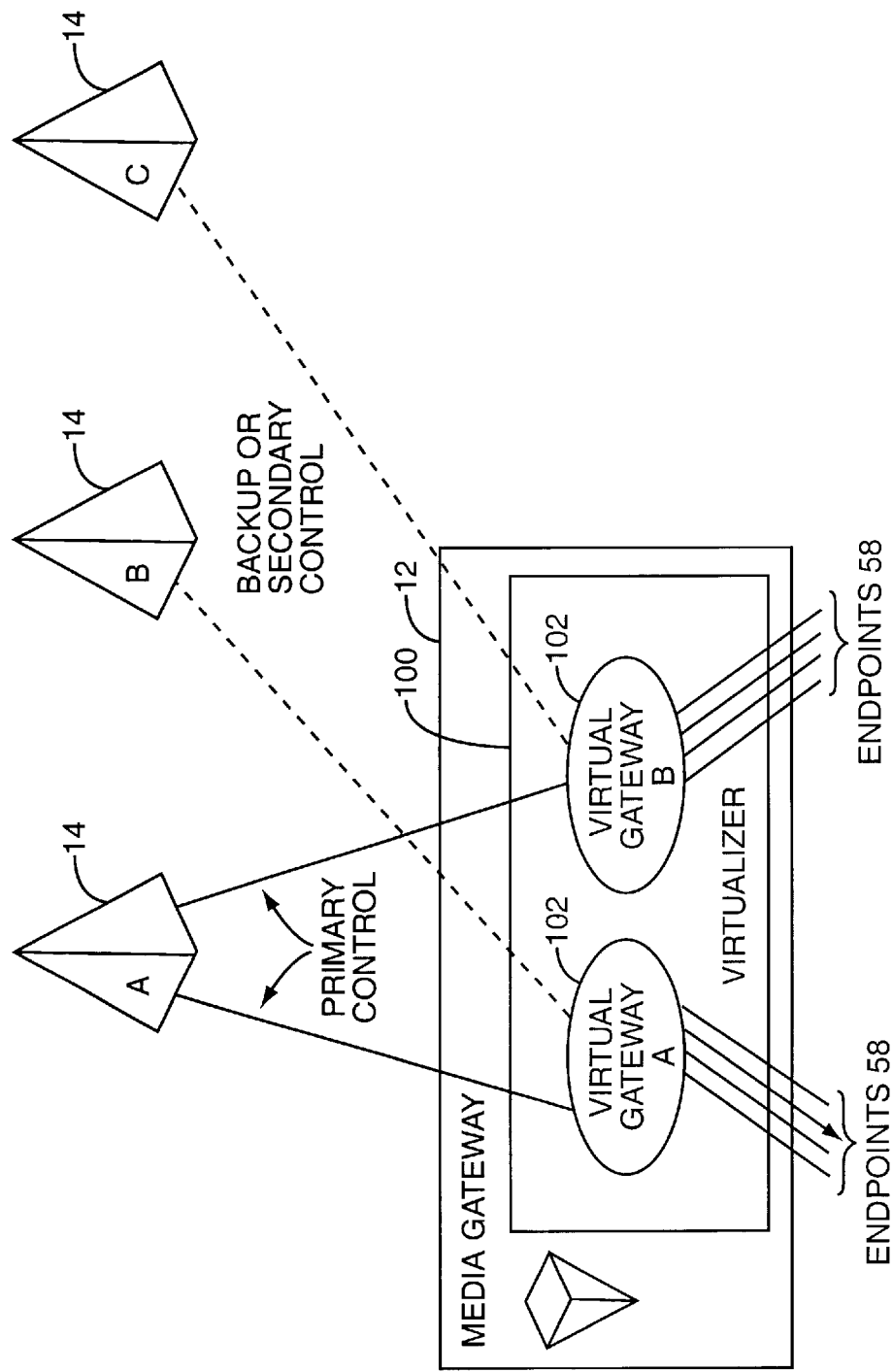
FIG. 8 is a block representation outlining the reallocation of a media gateway controller when a primary media gateway controller fails or requires reassignment due to traffic.

Referring now to FIG. 8, another benefit provided by dynamic allocation of endpoints among multiple media gateway controllers is the ability to maintain the mapping of the endpoints to both primary and backup media gateway controllers in order to protect against loss of a media gateway controller. If a failure occurs, the virtual gateways A and B (102) within the virtualizer 100 are re-assigned or re-registered as a unit from media gateway controller A (14) to one or more backup media gateway controllers B and C (14). Such an ability is very useful in the management of groups of endpoints 58 that cannot be distributed between media gateway controllers 14, such as members of trunk groups or business groups. Preferably, the mapping tables maintained in the virtualizer 100 are replicated in a backup node to protect against loss of the virtualizer itself. A backup virtualizer would re-register each virtual gateway 102 with another media gateway controller 14 in the event that the primary virtualizer 100 is no longer available. The re-registration would preferably work as discussed above using the service broker 104 in cooperation with the network manager 54.

Figure 9:
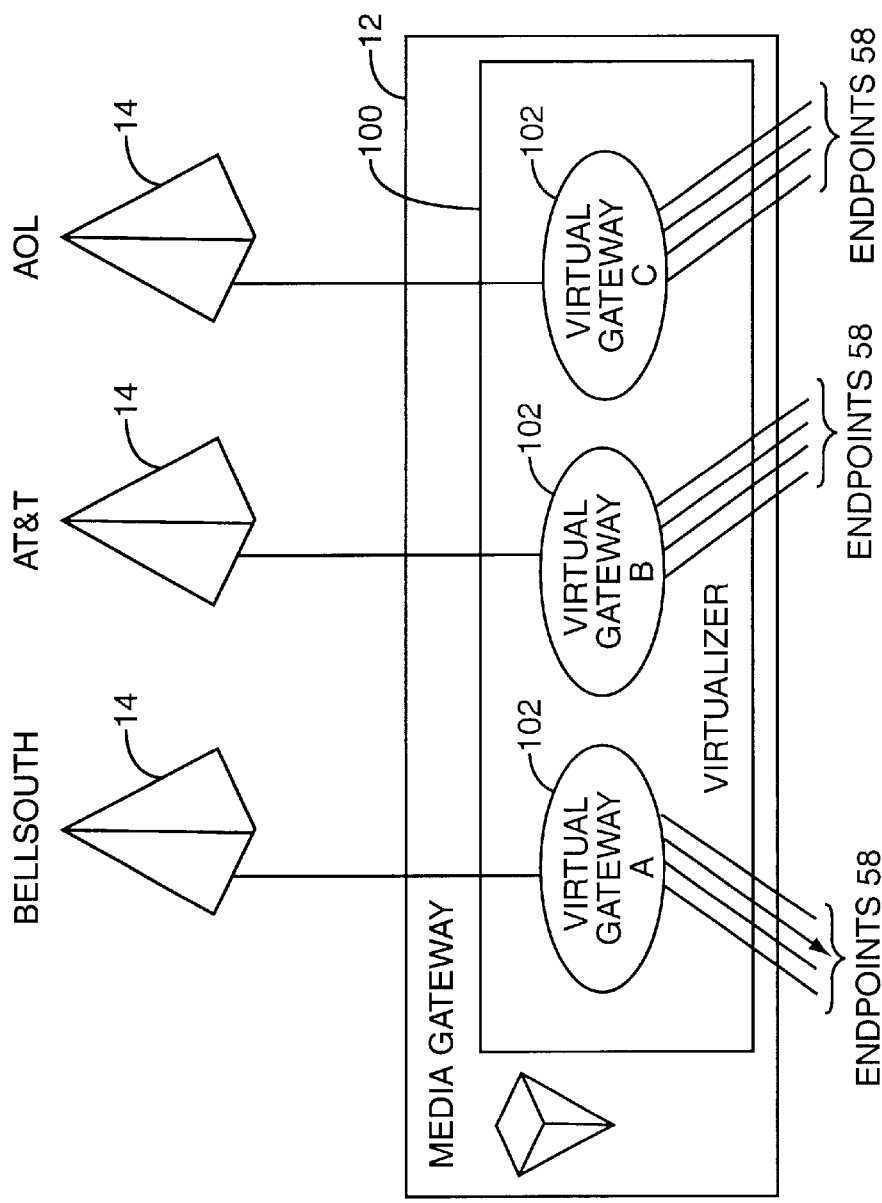
FIG. 9 is a block representation of a media gateway apportioning endpoints among multiple media gateway controllers capable of providing media control as well as services.

Partial allocation of endpoints 58 within a single media gateway 12 between multiple media gateway controllers 14 allows specific groups of endpoints 58 to interact with any number of service providers associated with a particular media gateway controller 14. As shown in FIG. 9, a single media gateway 12 may have three virtual gateways 102 within the virtualizer 100 servicing three sets of endpoints 58. Each set of endpoints 58 is registered with and receives service from different service providers, such as BellSouth, AT&T and America Online (AOL). Notably, these services may be anything from Internet connectivity to traditional telephony services. Importantly, endpoints 58 associated with each of the provider's media gateway controllers 14 may be grouped dynamically into separate virtual gateways 102.

Figure 10:
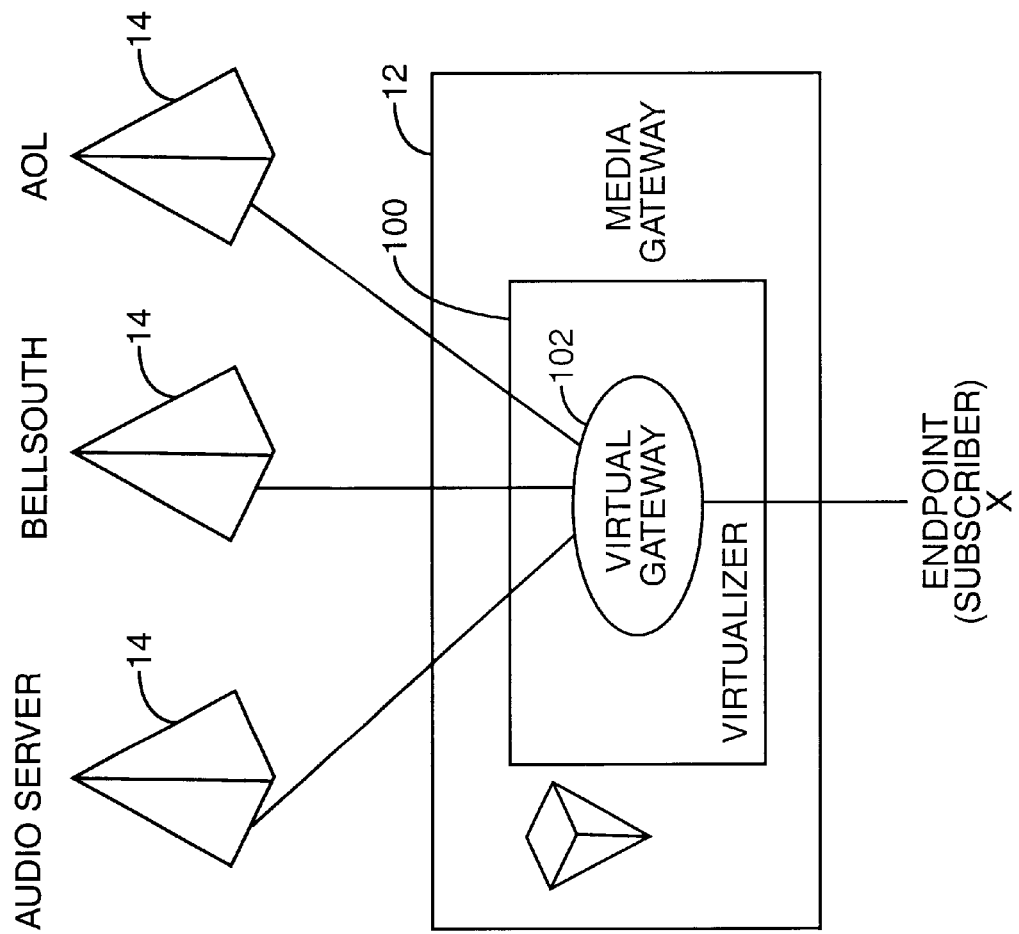
FIG. 10 is a block representation of a media gateway allowing access from multiple media gateway controllers and service providers to a single endpoint or subscriber.

In addition to allocating groups of endpoints 58 to particular service providers, any single endpoint 58 may be associated with multiple service providers as shown in FIG. 10. For example, an individual subscriber at a particular endpoint X may desire to initiate service requests to various content providers. A virtual gateway 102 may facilitate signaling connections to multiple providers and integrate the media stream provided to a user according to the user's equipment capability and configuration. In the example of FIG. 10, the individual may have an audio server, such as an MP3 provider, a telephony service, such as BellSouth, and an Internet service, such as AOL. Notably, the virtual gateway 102 may dynamically add additional service providers by registering the media gateway 12 with the requisite media gateway controller 14 or service content provider as desired by the subscriber.

Those of ordinary skill in the art will recognize modifications to the invention based on the teachings above. All such modifications are considered within the scope of the invention and the claims that follow.

What is claimed is:

1. A system for associating endpoints of a media gateway with a plurality of media gateway controllers, said system comprising a control system adapted to dynamically associate at least one endpoint from a media gateway such that said at least one endpoint can receive service from any one of a plurality of media gateway controllers within a network independent of a second media gateway controller providing service to other endpoints from the media gateway wherein said control system has a logical layer providing virtual gateways for mapping said at least one endpoint to a media gateway controller, such that each said virtual gateway appears as a media gateway to a media gateway controller and appears as a media gateway controller to a media gateway.

2. The system of claim 1 wherein said control system is further adapted to dynamically associate at least one endpoint with a virtual gateway and register said virtual gateway with a corresponding one of the media gateway controllers.

3. The system of claim 1 wherein said control system is flintier adapted to dynamically associate at least one endpoint to be registered with a certain media gateway controller and create one said virtual gateway mapping said at least one endpoint to the media gateway controller.

4. The system of claim 1 wherein said control system is further adapted to communicate with a network manager to identify a select one of the media gateway controllers to associate with said at least one endpoint and configure the associated virtual gateway accordingly.

5. The system of claim 1 wherein said control system is filer adapted to cooperate with said logical layer to provide protocol translation between a first protocol used by the media gateway and a second protocol used by the media gateway controller.

6. The system of claim 1 wherein said control system is further adapted to cooperate with said logical layer to reassign an endpoint from one virtual gateway to another virtual gateway.

7. The system of claim 1 wherein said control system is further adapted to cooperate with said logical layer to assign an endpoint to an existing virtual gateway being served by a media gateway controller.

8. The system of claim 1 wherein said control system is further adapted to cooperate with said logical layer to store a secondary media gateway controller for serving a virtual gateway and reassign the virtual gateway from a primary media gateway controller to the secondary media gateway controller as conditions necessitate.

9. The system of claim 8 wherein said control system is further adapted to cooperate with said logical layer to register said reassigned virtual gateway with said secondary media gateway controller.

10. The system of claim 1 wherein said control system is further adapted to cooperate with said logical layer to associate a first virtual gateway to a first media gateway controller for a first service provider and a second virtual gateway to a second media gateway controller for a second service provider such that endpoints on a common media gateway may be served by multiple service providers.

11. The system of claim 1 wherein said control system is further adapted to dynamically associate one endpoint from a media gateway with a plurality of media gateway controllers such that said one endpoint can receive service from said plurality of media gateway controllers.

12. The system of claim 1 wherein said control system is further adapted to cooperate with said logical layer to associate select endpoints from a plurality of media gateways with one virtual gateway.

13. The system of claim 1 wherein said control system is embedded within a media gateway.

14. The system of claim 1 wherein said control system is embedded within a media gateway controller.

15. The system of claim 1 wherein said control system is embedded within a device other than a media gateway and media gateway controller.

16. The system of claim 1 wherein said control system facilitates a service broker function adapted to assist in identifying at least one media gateway controller for the at least one endpoint.

17. A computer readable media comprising software for instructing a control system to dynamically associate at least one endpoint from a media gateway such that said at least one endpoint can receive service from any one of a plurality of media gateway controllers within a network independent of a second media gateway controller providing service to other endpoints from the media gateway wherein endpoints of a media gateway may be associated with different media gateway controllers wherein said control system is further instructed to create a logical layer providing virtual gateways for mapping said at least one endpoint to a media gateway controller, such that each said virtual gateway appears as a media gateway to a media gateway controller and appears as a media gateway controller to a media gateway.

18. The computer readable media of claim 17 wherein said control system is further instructed to dynamically associate at least one endpoint with a virtual gateway and register said virtual gateway with a corresponding one of the media gateway controllers.

19. The computer readable media of claim 17 wherein said control system is further instructed to dynamically associate at least one endpoint to be registered with a certain media gateway controller and create one said virtual gateway mapping said at least one endpoint to the media gateway controller.

20. The computer readable media of claim 17 wherein said control system is further instructed to cooperate with said logical layer to store a secondary media gateway controller for serving a virtual gateway and reassign the virtual gateway from a primary media gateway controller to the secondary media gateway controller as conditions necessitate.

21. The computer readable media of claim 20 wherein said control system is further instructed to cooperate with said logical layer to register said reassigned virtual gateway with said secondary media gateway controller.

22. The computer readable media of claim 17 wherein said control system is further instructed to cooperate with said logical layer to associate a first virtual gateway to a first media gateway controller for a fist service provider and a second virtual gateway to a second media gateway controller for a second service provider such, that endpoints on a common media gateway may be served by multiple service providers.

23. The computer readable media of claim 17 wherein said control system is further instructed to dynamically associate one endpoint from a media gateway with a plurality of media gateway controllers such that said one endpoint can receive service from said a plurality of media gateway controllers.

24. The computer readable media of claim 17 wherein said control system is further instructed to cooperate with said logical layer to associate select endpoints from a plurality of media gateways with one virtual gateway.

25. A system for associating endpoints of a media gateway with a plurality of media gateway controllers, said system comprising means adapted to dynamically associate at least one endpoint from media gateway such that said at least one endpoint can receive service from one of a plurality of media gateway controllers within a network independent of a second media gateway controller providing service to other endpoints from the media gateway, said means adapted to dynamically associate further provides virtual gateways for mapping said at least one endpoint receiving service to a media gateway controller, such that each said virtual gateway appears as a media gateway to a media gateway controller and appears as a media gateway controller to a media gateway.

26. The system of claim 25 further comprising:

a) means to interface with a plurality endpoints of a media gateway;

b) means to interface with a packet network to facilitate communication with said media gateway controller, and c) means to facilitate a media path to after media entity based on instruction from the media gateway controller.

27. A method of associating endpoints of a media gateway with a plurality of media gateway controllers comprising:

a) providing virtual gateways associated with a media gateway;

b) associating at least one endpoint of at least one media gateway with one said virtual gateway such that said at least one endpoint can receive service from one of a plurality of media gateway controllers via the virtual gateway independent of a media gateway controller providing service to other endpoints from the media gateway;

c) mapping signals received from the media gateway controller to the media gateway for the at least one endpoint; and d) mapping signals received from the media gateway for the at least one endpoint to the media gateway controller.

28. The method of claim 27 wherein providing virtual gateways associated with the media gateway comprises providing virtual gateways associated with the media gateway with a logical layer.

* * * * *